(12) United States Patent
Higley

(10) Patent No.: US 12,197,014 B2
(45) Date of Patent: Jan. 14, 2025

(54) FIBER OPTIC CONNECTOR ADAPTER WITH NON-INVASIVE INTEGRAL EXTERNAL LATCHES FOR ATTACHMENT TO AN ADAPTER PANEL

(71) Applicant: US Conec, Ltd, Hickory, NC (US)

(72) Inventor: Jason Higley, Hickory, NC (US)

(73) Assignee: US Conec Ltd., Hickory, NC (US)

(*) Notice: Subject to any disclaimer, the term of this patent is extended or adjusted under 35 U.S.C. 154(b) by 90 days.

(21) Appl. No.: 17/669,758

(22) Filed: Feb. 11, 2022

(65) Prior Publication Data

US 2022/0269010 A1 Aug. 25, 2022

Related U.S. Application Data

(60) Provisional application No. 63/151,256, filed on Feb. 19, 2021.

(51) Int. Cl.
*G02B 6/00* (2006.01)
*G02B 6/38* (2006.01)

(52) U.S. Cl.
CPC ......... *G02B 6/3825* (2013.01); *G02B 6/3831* (2013.01); *G02B 6/3897* (2013.01)

(58) Field of Classification Search
CPC .. G02B 6/3825; G02B 6/3831; G02B 6/3897; G02B 6/00
See application file for complete search history.

(56) References Cited

U.S. PATENT DOCUMENTS

| | | | |
|---|---|---|---|
| 6,513,989 B1 | 2/2003 | Bleck et al. | |
| 10,338,323 B2* | 7/2019 | Lu | G02B 6/3879 |
| 10,761,273 B2* | 9/2020 | Takano | G02B 6/3825 |
| 2019/0271816 A1* | 9/2019 | Wong | G02B 6/3885 |

* cited by examiner

*Primary Examiner* — Jennifer Doan
(74) *Attorney, Agent, or Firm* — Michael L Leetzow PLLC; Shubhrangshu Sengupta

(57) ABSTRACT

An adapter has a main body with a central opening extending between two sides and latches to engage a panel into which the adapter is disposed. The main body also includes latch receptacles on an outside portion to receive the latches when compressed during insertion into the panel. The receptacles are not in communication with the central opening, preventing dirt and debris from entering the central opening from around the latches.

18 Claims, 17 Drawing Sheets

FIBER OPTIC CONNECTOR ADAPTER WITH NON-INVASIVE INTEGRAL EXTERNAL LATCHES FOR ATTACHMENT TO AN ADAPTER PANEL

REFERENCE TO RELATED CASE

This application claims priority under 35 U.S.C. § 119 (e) to U.S. provisional application No. 63/151,256 filed on Feb. 19, 2021, the contents of which are hereby incorporated by reference in their entirety.

BACKGROUND OF THE INVENTION

Fiber optic connectors typically connect to other fiber optic connectors via interfaces known as adapters. These adapters are usually aggregated at an adapter panel to which the adapters attach. Typically, the adapters have latches that are used to attach the adapters to the adapter panel. The latches are typically disposed within openings or cutouts in a body of the adapter. The openings or cutouts allow the latches to flex through the body and into a central opening in the adapter as the adapter is being pushed through the adapter panel for attachment. One such typical latch is shown in FIG. 1. As a result, any debris generated due to the latching action, as well as ambient dust, can enter the internal space of the adapter through these latch openings. This can cause connection issues for the fiber optic connectors mating inside the adapters. The connection issues can be caused, for example, by dust and/or debris being trapped in an optical path of an optical connection inside the adapter in a connector mating area.

Other types of adapters may include a metallic clip that is installed as a separate component over the adapter body. However, this separate component adds to the cost of the adapter and also to labor costs since these metallic clips have to be manually installed. Further, the metallic clip may create a rattling noise due to vibrations received from other components nearby (e.g., fans on a circuit board). With several such metallic clips, the rattling noise is a concern too.

Thus, there is a need for reducing and/or eliminating any potential situations where the latching of the adapters to the adapter panel causes generation of debris and dust to enter the fiber optic connector mating space within the adapter.

SUMMARY OF THE INVENTION

According to one aspect, the present invention is directed to a fiber optic adapter for connecting fiber optic connectors that includes a main body having a top wall and a bottom wall joined to each other by a pair of oppositely disposed side walls along respective edges, the main body having an outside surface, a first side, a second side longitudinally opposite the first side, and a main opening, the main opening defined by the top wall, bottom wall and the side walls and extending between the first side and the second side to accept at least one fiber optic connector for mating in each of the first side and the second side, an inner surface defined at least in part by the top wall, the bottom wall, and the side walls, the inner surface surrounding the main opening, the main opening having a fiber optic connector mating space within which the at least one fiber optic connector in each of the first side and second side mate, the inner surface having a continuous separation from the outside surface at least around the connector mating space by a material of the fiber optic adapter, at least two latch receptacles formed on the outside surface, and at least two external latches formed respectively at the at least two latch receptacles on the outside surface without communicating with the inner surface of the fiber optic adapter to maintain the continuous separation of the inner surface from the outer surface of the main body of the fiber optic adapter.

In some embodiments, there may also be a flange on each of the outside surfaces of two opposing side walls or on each of the outside surfaces of the top wall and the bottom wall.

In some embodiments, a distance between the flange and an engagement surface of the external latch corresponds to a width of an adapter panel.

In some embodiments, the external latch is a cantilevered member.

In some embodiments, the at least two latch receptacles cause a discontinuity in the outside surface.

In some embodiments, the at least two external latches are integrally formed with the main body of the fiber optic adapter.

In yet another aspect, there is a fiber optic adapter for connecting fiber optic connectors that includes a main body having a top wall and a bottom wall and two side walls, the main body having an outside surface, a first side, a second side, and a main opening, the main opening defined by the top wall, bottom wall and side walls and extending between the first side and the second side to accept at least one fiber optic connector for mating in each of the first side and the second side, an inner surface defined at least in part by the top wall, the bottom wall, and the side walls, the inner surface surrounding the main opening, the inner surface having a continuous separation from the outside surface by a material of the fiber optic adapter, at least two latch receptacles formed on the outside surface, and at least two external latches formed respectively at the at least two latch receptacles on the outside surface without communicating with the inner surface of the fiber optic adapter.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
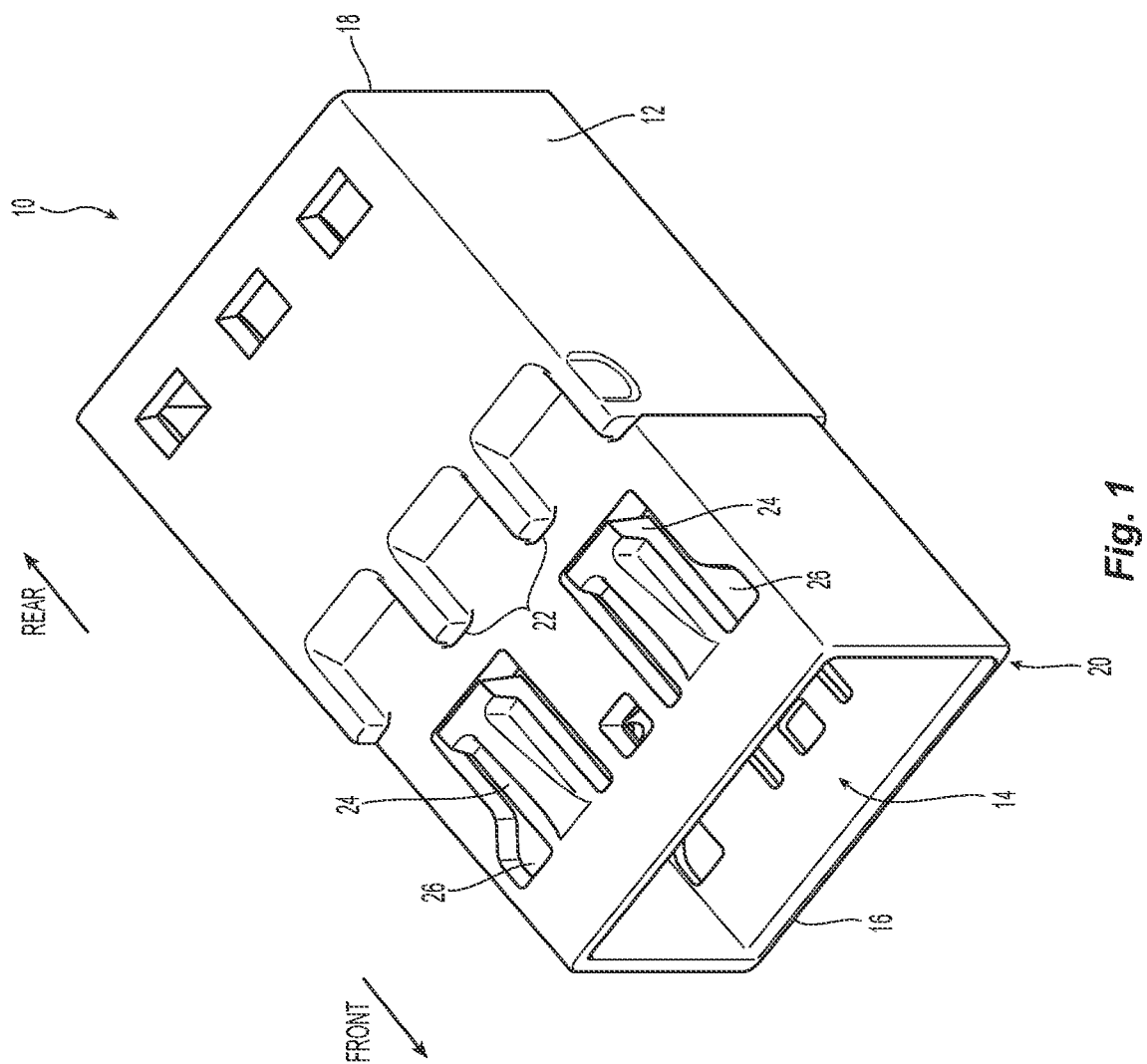
FIG. 1 is a perspective view of one embodiment of a prior art adapter.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
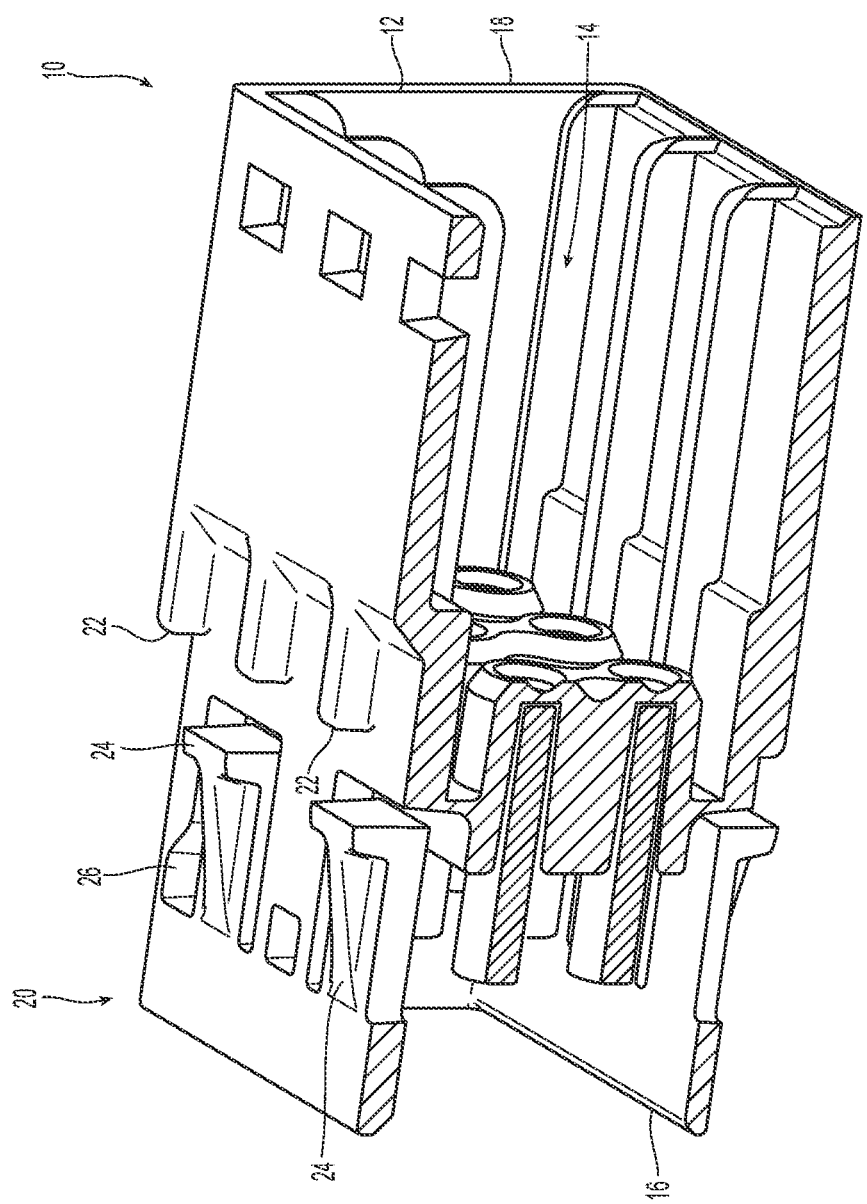
FIG. 2 is a side cross section of the prior art adapter in FIG. 1.

Illustrated in FIGS. 1 and 2 is a prior art adapter 10. The adapter 10 has a main body 12 and a central opening 14 to receive fiber optic connectors (not shown) in opposing ends 16,18. To connect the adapter 10 to an adapter panel, the front end 20 of the adapter 10 is inserted in to an opening in the adapter panel. The adapter 10 is pushed into the adapter panel until the forward facing surfaces 22 make contact with the adapter panel. There are two latches 24 that prevent the adapter 10 from being unintentionally removed from the adapter panel. As the adapter 10 is inserted into the opening, the latches 24 are pushed downward toward the main body 12 into the latch openings 26. As can be seen in FIG. 2, the latch openings 26 penetrate all the way through the main body 12 allowing dirt and debris to enter therethrough. It should also be noted that the fiber optic connectors that are inserted into each side of the main body 12 are mated in close proximity to the latch openings. There may be additional openings in the adapter 10 that exacerbate the problem of dust and debris.

One embodiment of an adapter 100 according to the present invention is illustrated in FIGS. 3-10. The adapter 100 has a main body 102 with a top wall 104 and a bottom wall 106 joined to each other by a pair of oppositely disposed side walls 108,110 along respective edges, that is top edges 112 and bottom edges 114. These walls provide the main body 102 with an outer or outside surface 116. The adapter 100 is preferably molded as a unitary piece from the same material and in a single mold, but could be assembled from a plurality of pieces that are either the same or different materials. Thus, the recitation of the walls is merely to describe the structures and not to be limiting by requiring that the walls be separate elements.

Applicant notes that the term "front" or "forward" means that direction where the adapter would be inserted into an adapter panel, while the term "rear" or "rearward" is used to mean the opposite direction. In the present application, the adapter 100 will therefore have a front and a rear, the front will be inserted into the panel first. Thus, in FIG. 3, the "front" of the adapter 100 is on the left side of the figure and pointing out of the figure. The "rear" or "back" is that part of the adapter 100 that is on the right side of the page and "rearward" and "backward" is toward the right and into the page.

The adapter 100 has a first side 120 and a second side 122 longitudinally opposite the first side 120, the first side 120 and the second side 122 are configured to receive at least one fiber optic connector for mating along the longitudinal axis A in a main opening 124. The first side 120 and the second side 122 are illustrated in the figures to receive four such fiber optic connectors (not shown) in the main opening 124. The adapter 100 could be configured to receive more or fewer fiber optic connectors therein. The main opening 124 is, at least in part, defined by the top wall 104, the bottom wall 106 and the side walls 108,110, and extends between the first side 120 and the second side 122 to accept the fiber optic connectors for mating. The adapter 100 may have a footprint conformant to one or more industry standards or per industry multi-source agreements (e.g., QSFP).

The main body 102 has an inner surface 126 defined at least in part by the top wall 104, the bottom wall 106 and the side walls 108,110, the inner surface surrounding and defining at least a portion of the main opening 124. The main opening 124 has a fiber optic connector mating space 130 for the mating of the fiber optic connectors inserted from each of the first side 120 and second side 122. The mating space 130 is generally in a central portion inside the main body 102 of the adapter 100. It should be noted that the mating space 130 may be disposed at other locations along the length of the adapter 100. The inner surface 126 has a continuous separation from the outside surface 116 at least around the fiber-optic connector mating space 130 by a material (or more than one material) of the fiber optic adapter 100. See FIGS. 5, 8, and 10. Preferably, the inner surface 126 is substantially fully separated from the outside surface 116 by the material of the adapter. There may be latch openings 152 near the front and rear ends of the adapter 100, but those latch openings 152 are far away from the connector mating space 130 to contribute any substantial dust or debris.

The adapter 100 also has at least two latch receptacles 132 formed on the outside surface 116 of the main body 102. As illustrated in several of the figures, there are four such latch receptacles 132 in one embodiment. It is possible that there could be fewer or more latch receptacles 132 in the adapter 100 and still be within the scope of the claimed invention. Also as illustrated, the latch receptacles 132 could be formed along the edges of the top wall 104 and the side walls 108,110 (see FIG. 3) as well as the bottom wall 106 and the side walls 108,110 (see FIG. 4). However, they may also be formed completely within one of the top wall 104, the bottom wall 106 and the side walls 108,110. As can be seen in the figures, see in particular FIG. 5, the latch receptacles 132 cause a discontinuity in a plane of the outside surface 116. That is, the latch receptacles 132 have edges and prevent the outside surface from being on an uninterrupted or smooth plane all the way across and around the adapter 100.

Associated with each of the latch receptacles 132 are external latches 134. The external latches 134 are "external" in the sense that they are outside the main body 102 and do not penetrate to the interior of the main body 102. In this respect, the external latches 134 are non-invasive to the adapter 100. The external latches 134 are preferably formed within a portion of the latch receptacles 132, and are integrally molded with the main body 102. As illustrated, the external latches 134 are cantilevered and have a sloped front surface 136. See, e.g., FIG. 7. The latch receptacles 132 also have a rearward facing flat surface 138 that engages the panel 200 (see FIG. 9) when the adapter 100 is disposed within the panel 200 to reduce the possibilities of the adapter inadvertently falling out of the adapter panel 200. The sloped front surface 136 cause the external latches 134 to be deflected into a corresponding latch receptacle 132 as the external latches 134 pass through an opening or a window 202 in the panel 200. However, the external latches 134 do not penetrate the outer surface 116 or move into the main opening 124. In this case, the external latches 134 always remain outside the main body 102 and the main opening 124, thereby not providing any openings into the adapter for dust and debris to enter. The main body 102 of the adapter 100 has, at the locations of the latch receptacles 132, a thickened area T between the outside surface 116 and the inner surface 126 at the intersections of the walls (top edges 112 and bottom edges 114). See, e.g., FIGS. 8 and 10 (without any center partition).

Figure 3:
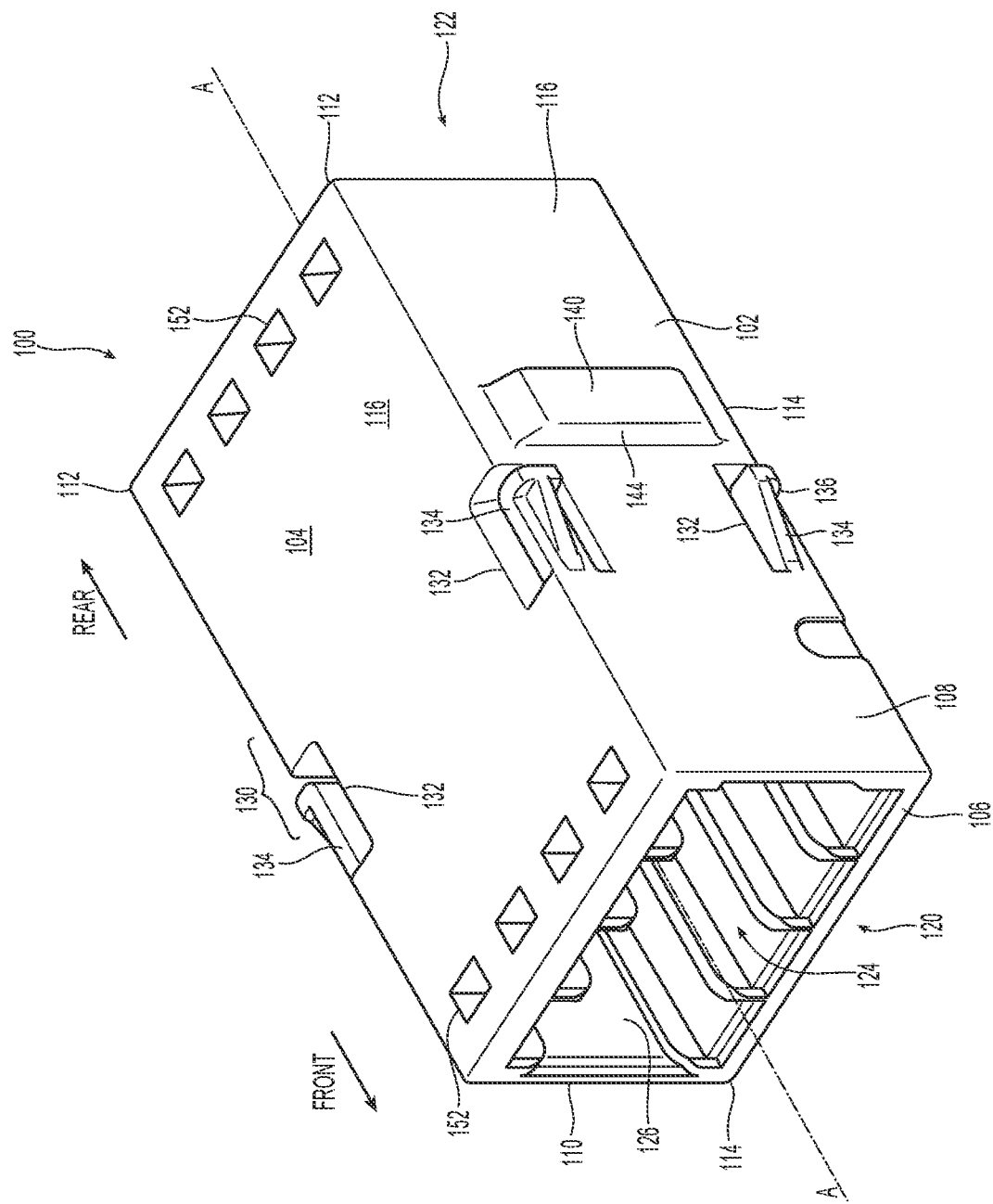
FIG. 3 is a perspective view from the front upper left of one embodiment of an adapter according to the present invention.
Figure 4:
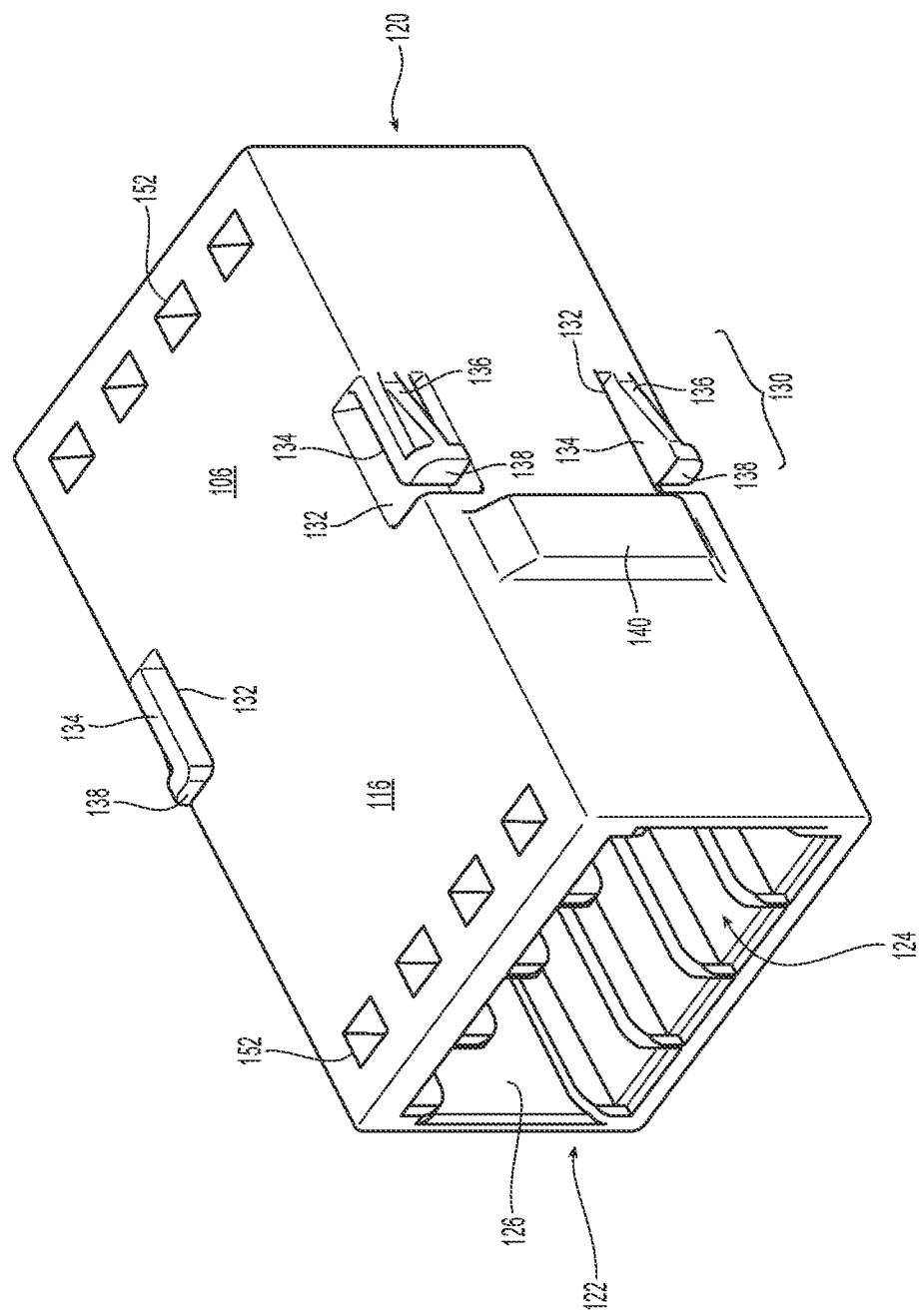
FIG. 4 is a perspective view from the rear bottom left of the adapter in FIG. 3.
Figure 5:
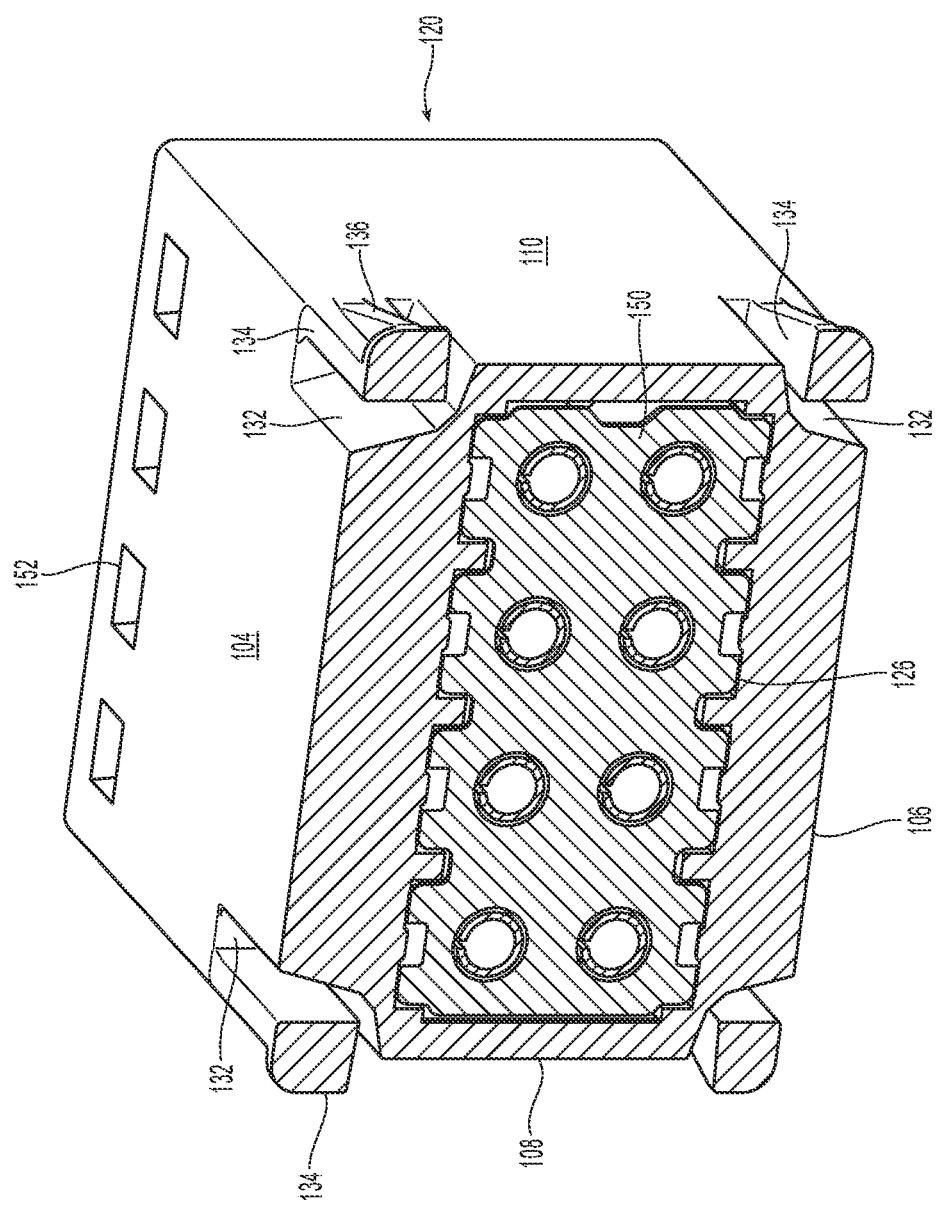
FIG. 5 is a cross sectional view of the adapter in FIG. 4.
Figure 6:
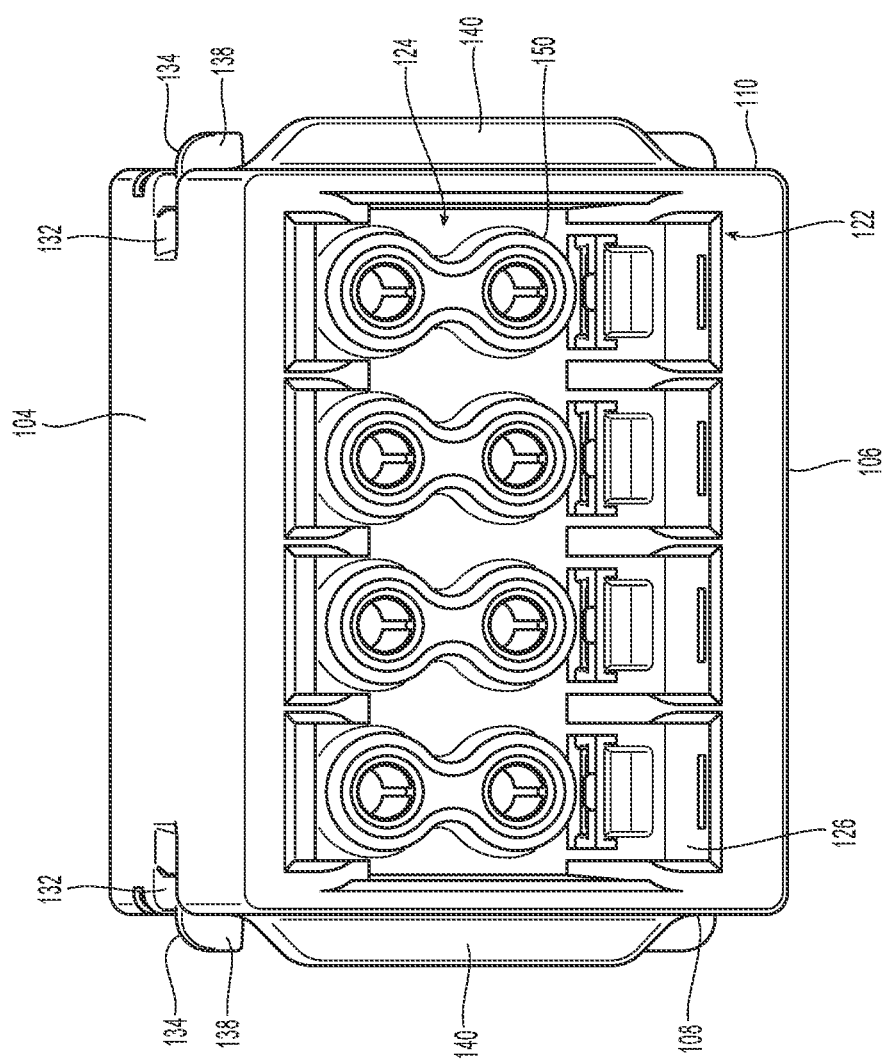
FIG. 6 is perspective view from the rear of the adapter in FIG. 4.

It should also be noted that the adapter 100 has two flanges 140 that extend from the outside surface 116 and the side walls 108,110 (see FIGS. 3 and 4). Again, the flanges 140 could be on other walls of the main body 102 and need not be across the main opening from one another (i.e., one could be on a side wall 108,110) and one could be on a top wall 104 or bottom wall 106. Additionally, the flanges 140 could have other configurations and positions along the walls from that illustrated in the figures.

Figure 7:
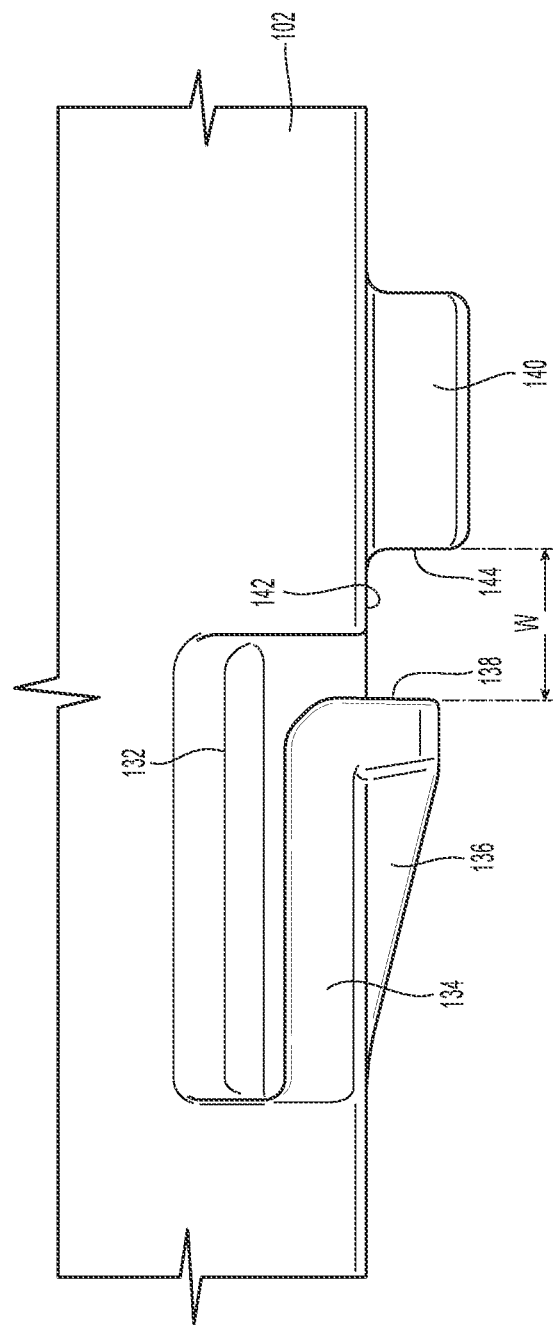
FIG. 7 is a view of a portion of the adapter with an external latch.
Figure 8:
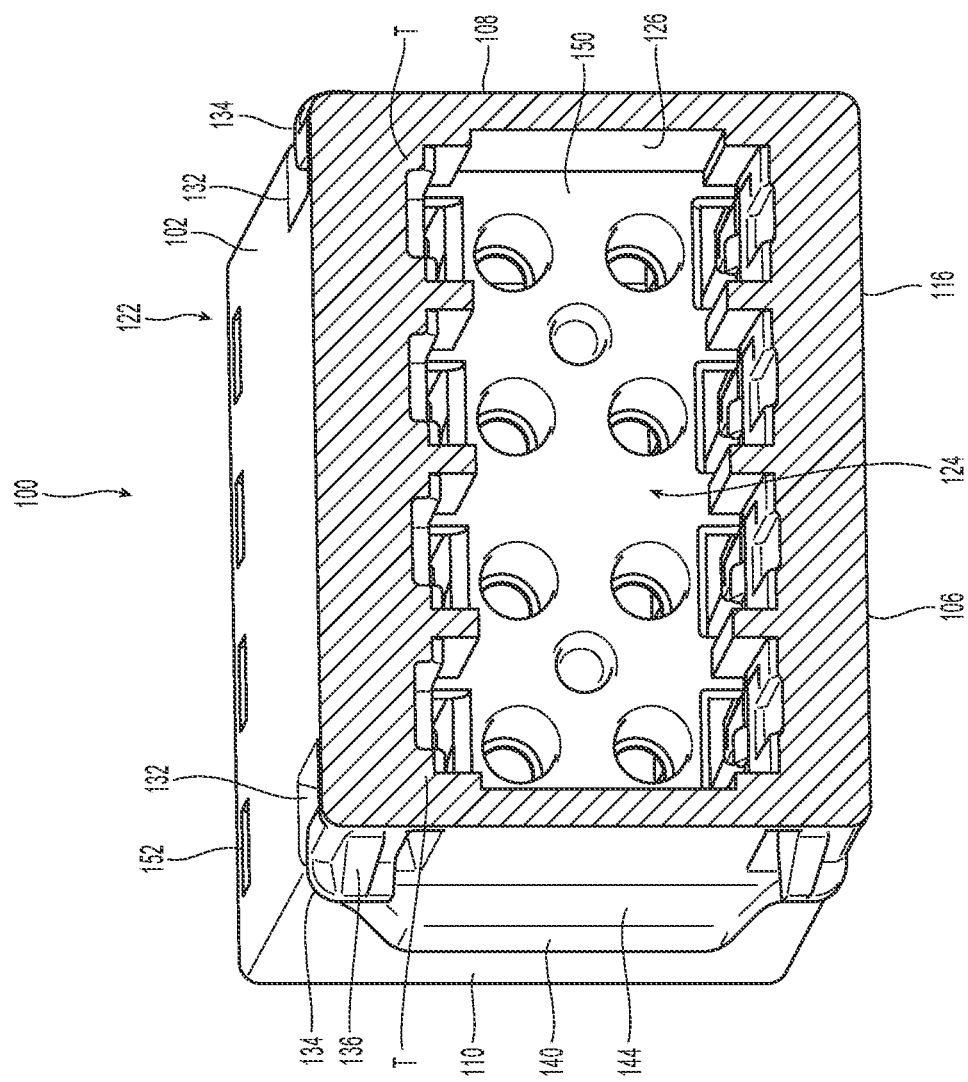
FIG. 8 is a cross section view of the adapter in FIG. 4 from the front.

As best seen in FIG. 7, the adapter 100 has a space 142 between a forward surface 144 of the flange 140 and the rearward facing flat surface 138. The space 142 has a width W that corresponds to the width of the panel 200 at the window 202. It may be that the width W is slightly smaller than the width of the panel 200 at the window 202 to allow for an easy return of the external latch 134 after the adapter 100 is inserted into the panel. However, the larger the width W is, the more the adapter 100 may move about in the panel 200, and such movement is clearly not preferred.

Figure 9:
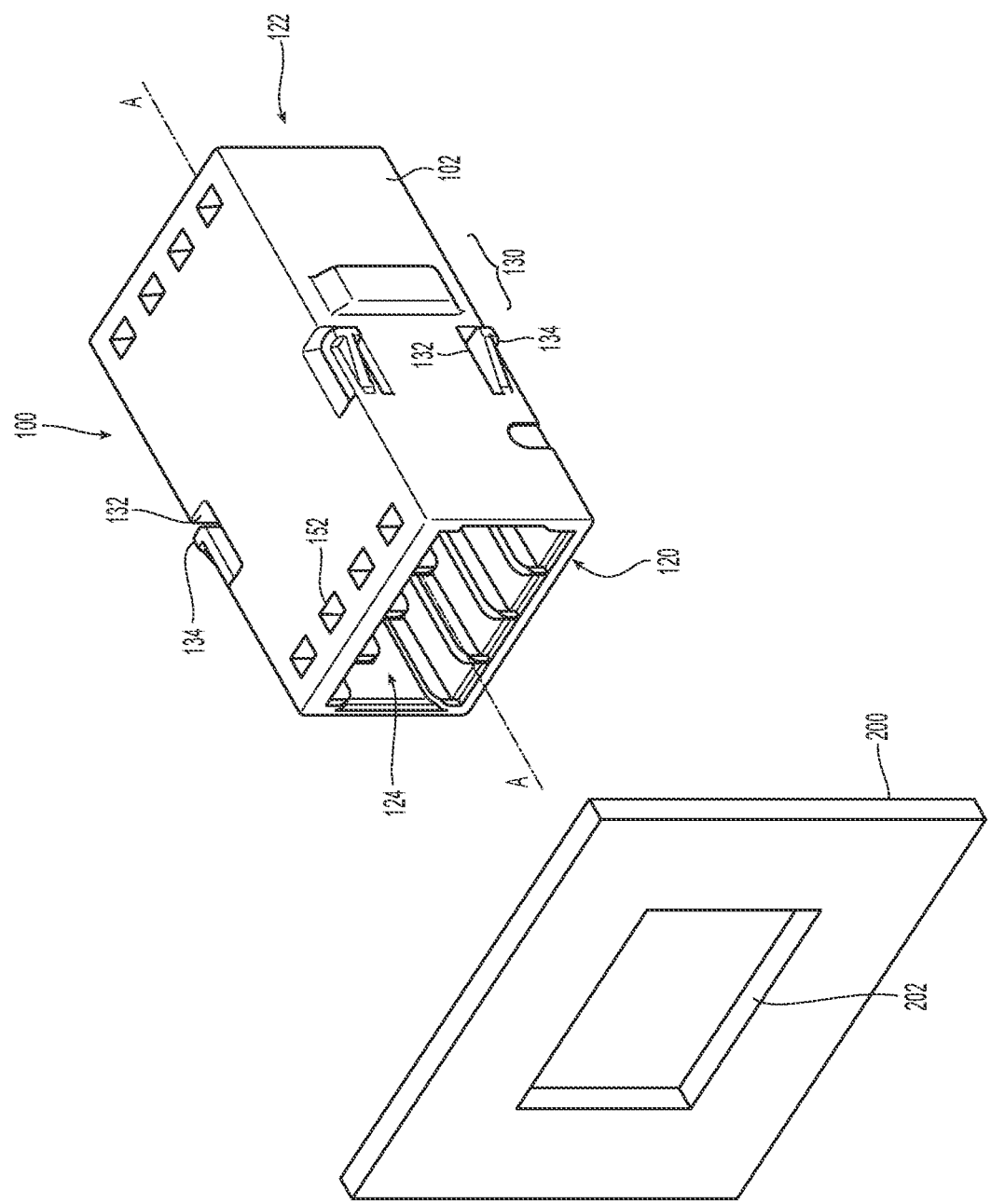
FIG. 9 is a perspective view of the adapter in FIG. 4 prior to being inserted into an opening in an adapter panel.
Figure 10:
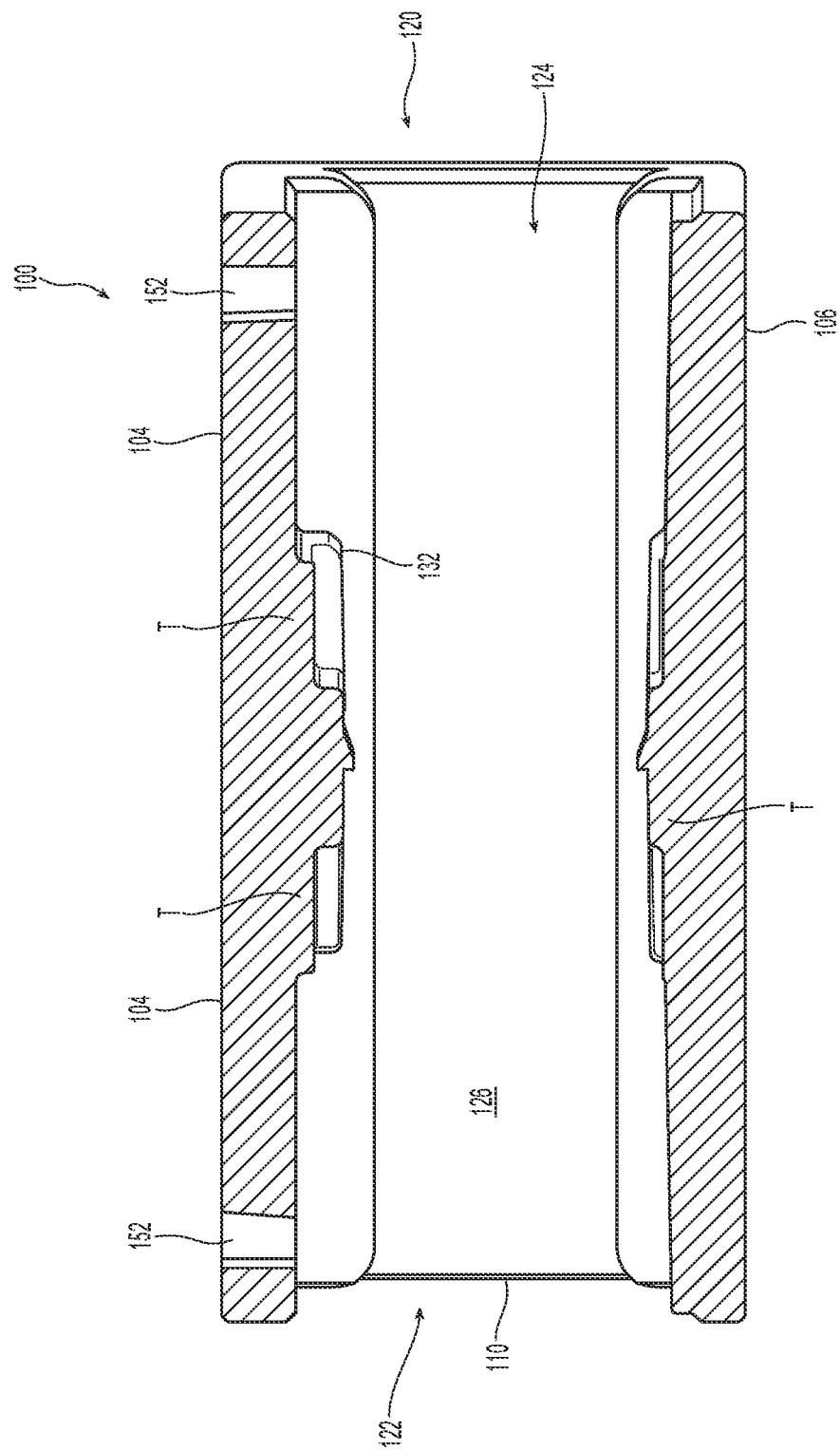
FIG. 10 is a cross section view of the adapter in FIG. 4 showing no openings in a central portion of the main body of the adapter in FIG. 4.

To insert the adapter 100 into the panel 200, one only needs to use firm pressure to push the front end or the first side 120 into the opening 202 in FIG. 9. The external latches 134 will deflect inward into the latch receptacles 132 as the panel 200 makes contact with the sloped front surface 136 of the external latches 134. As the adapter 201 is pushed farther, the flanges 140 will prevent the adapter 100 from being inserted too far. At about the same time, the external latches 134 will return to their position and the rearward facing flat surface 138 will engage the panel 200. When attached to the panel 200, the external latches 134 will be on one side of the panel 200 and the flanges 140 will be on the opposite side, such that the panel 200 is in-between moving along the longitudinal axis A. To remove the adapter 100, a user can push the external latches 134 into the latch receptacles 132 and allow the adapter 100 to be removed.

The adapter 100 may also have a central partition 150 that is located in the mating space 130. See, e.g., FIGS. 5, 6, 8, and 10. The central partition 150 may assist in the mating of the fiber optic connectors that are inserted from the first side 120 and the second side 122. However, this central partition 150 need not be present for the adapter to work as desired. Additionally, the central partition 150 is typically a separate piece and is added after the fact.

The adapter 100 may also have the latch openings 152 adjacent the first side 120 and the second side 122 to receive latches from the fiber optic connectors that are inserted on either side. However, given the distance from the latch openings 152 from the mating space 130, the likelihood of dust and debris getting into the adapter 100 and the mating space 130 is quite low.

Figure 11:
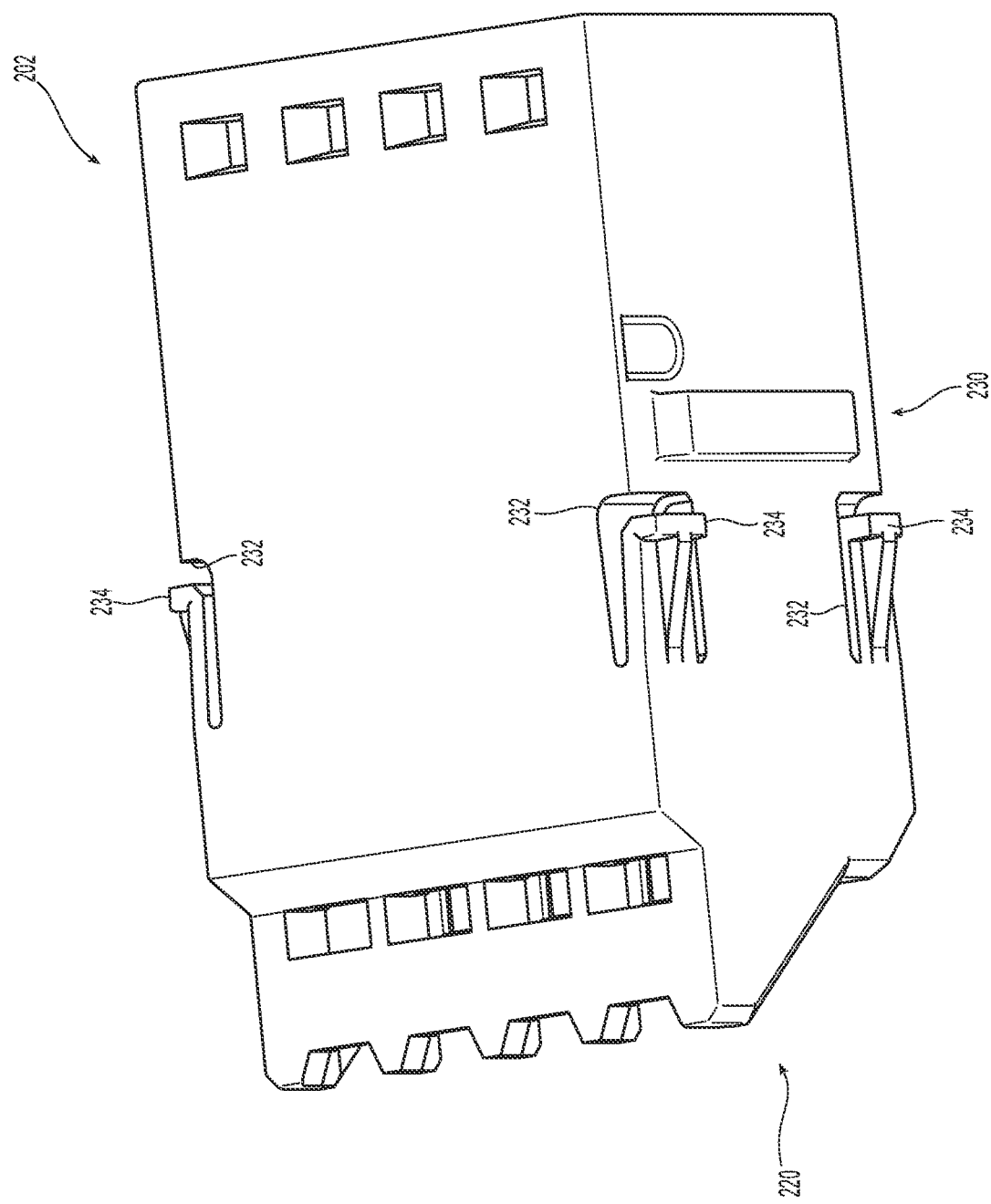
FIG. 11 is a perspective view from the front upper left of a second embodiment of an adapter according to the present invention.
Figure 12:
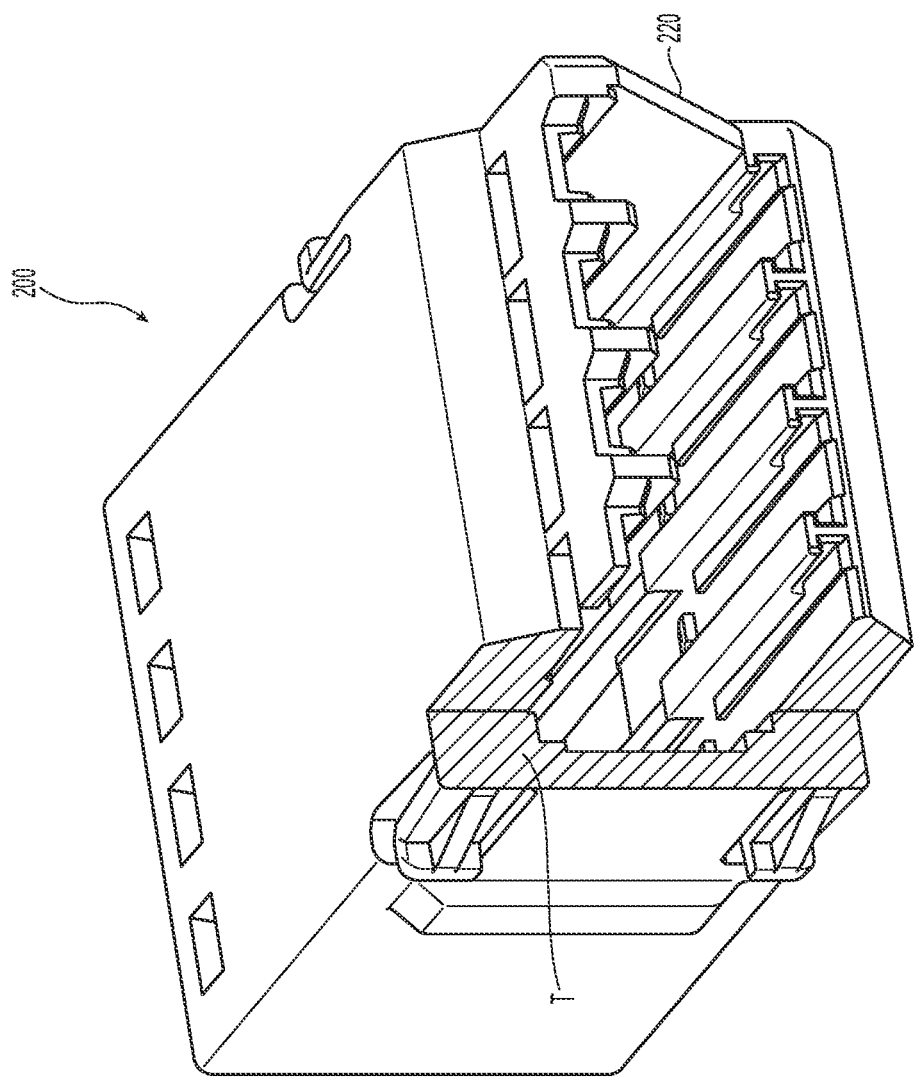
FIG. 12 is a partial cross section of the adapter in FIG. 11 showing that there are no openings in a central portion of the main body of the adapter.

Another embodiment of an adapter 202 according to the present invention is illustrated in FIGS. 11 and 12. The adapter 202 is a larger adapter than in the previous embodiment and does not have a central partition. Also, the first side 220 is configured to receive larger fiber optic connectors, such as the MDC fiber optic connectors that are available from the applicant. This also allows for a larger thickened area T' as well as larger latch receptacles 232 and latches 234. Again, this adapter 202 is sealed around the mating area 230 and prevents dust and debris from entering therein.

A third embodiment of an adapter 300 according to the present invention is illustrated in FIGS. 13-17. The adapter 300 has a main body 302 that accepts an MPO fiber optic connector at a first side 320 and a second side 322 in a main opening 324 along the longitudinal axis B.

The adapter 300 has a main body 302 with a top wall 304 and a bottom wall 306 joined to each other by a pair of oppositely disposed side walls 308,310 along respective edges, that is top edges 312 and bottom edges 314. These walls provide the main body 302 with an outer or outside surface 316. The adapter 300 is preferably molded as a unitary piece from the same material and in a single mold, but could be assembled from a plurality of pieces that are either the same or different materials.

The main opening 324 is, at least in part, defined by the top wall 304, the bottom wall 306 and the side walls 308,310, and extends between the first side 320 and the second side 322 to accept the MPO fiber optic connectors for mating. See, e.g., FIG. 16.

The main body 302 has an inner surface 326 defined at least in part by the top wall 304, the bottom wall 306 and the side walls 308,310, the inner surface 326 surrounding and defining at least a portion of the main opening 324. The main opening 324 has a fiber optic connector mating space 330 for the mating of the fiber optic connectors inserted from each of the first side 320 and second side 322. The inner surface 326 has a continuous separation from the outside surface 316 at least around the fiber-optic connector mating space 330 by a material (or more than one) of the fiber optic adapter 100.

Figure 13:
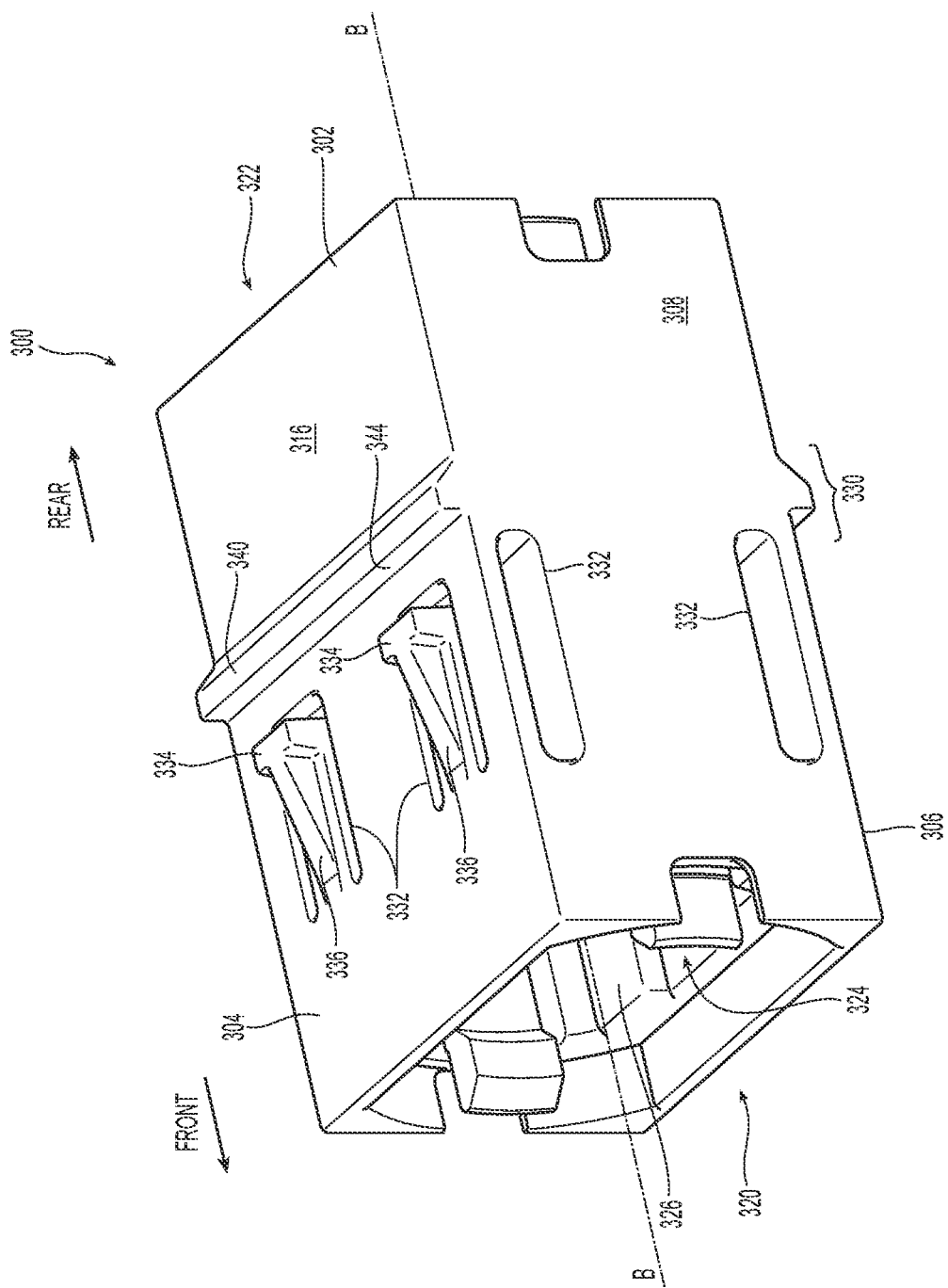
FIG. 13 is a perspective view from the front upper left of a third embodiment of an adapter according to the present invention.
Figure 14:
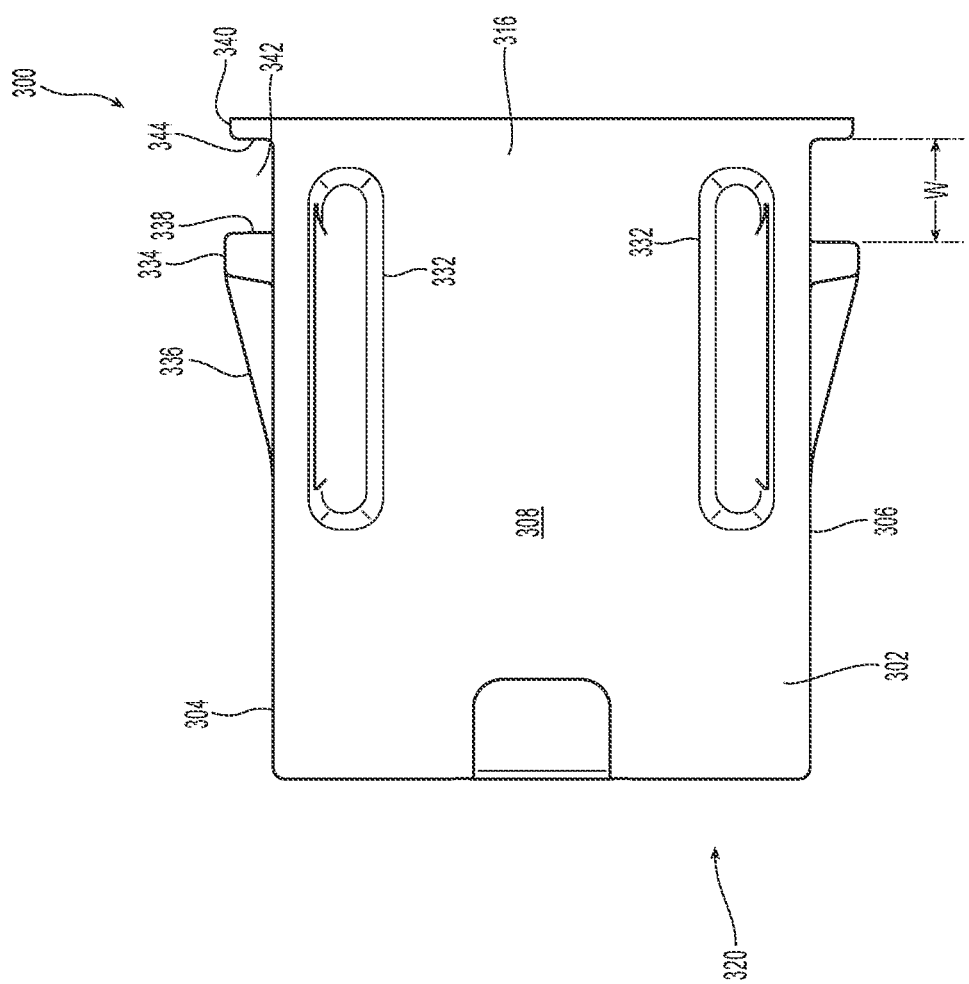
FIG. 14 is a partial left elevational view of the adapter in FIG. 13.
Figure 15:
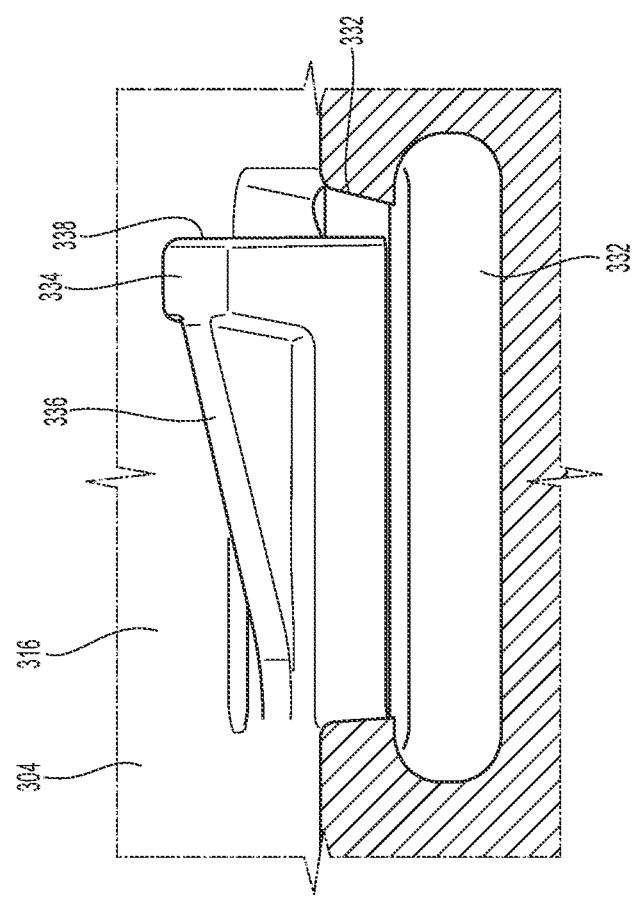
FIG. 15 is left elevational view of an enlarged portion of the adapter in FIG. 14.
Figure 16:
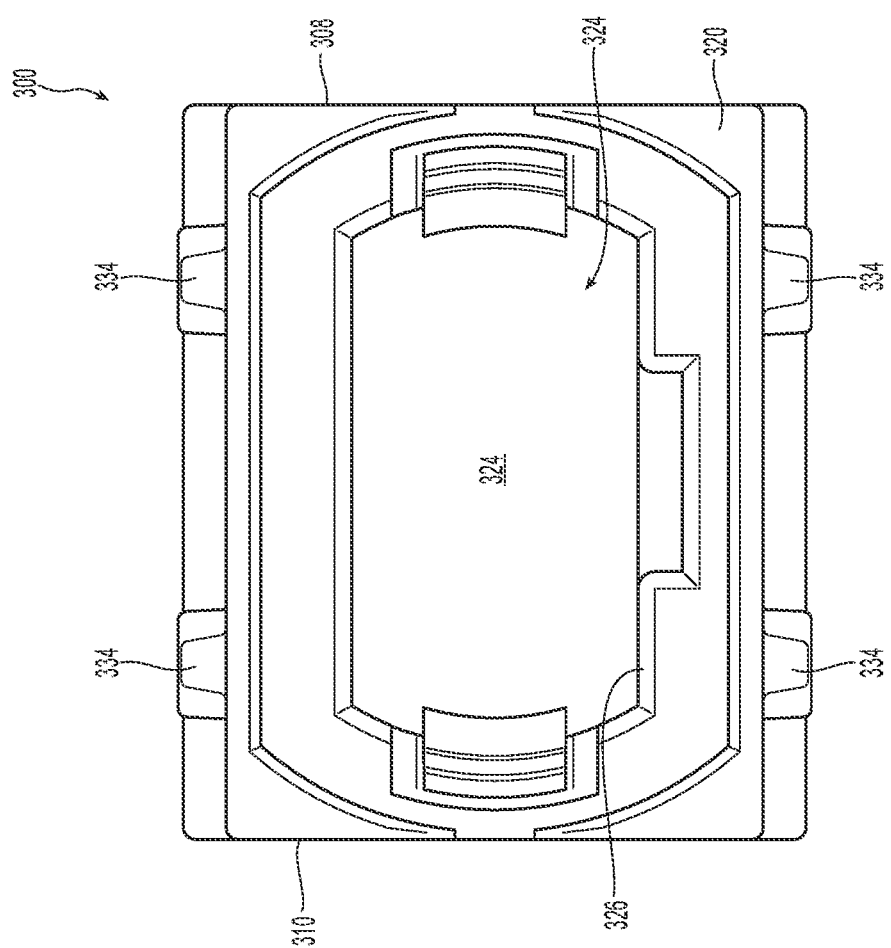
FIG. 16 is front elevational view of the adapter in FIG. 13.

The adapter 300 also has at least two latch receptacles 332 formed on the outside surface 316 of the main body 302, but there are preferably four. In this embodiment, the latch receptacles 332 are disposed in only one side of the main body—the top wall 304 and the bottom wall 306, but could also be formed in the side walls 308,310. Indeed, as seen in FIGS. 13-15, the latch receptacles 332 also open through the side walls 308,310. The latch receptacles 332 in the top wall 304 and the bottom wall 306 are in communication with a respective opening in the side walls 308,310. However, it should be noted that the latch receptacles 332 could be formed along the edges as well. As illustrated in several of the figures, there are four such latch receptacles 332 in this embodiment. It is possible that there could be fewer or more latch receptacles 332 in the adapter 300 and still be within the scope of the claimed invention. As can be seen in the figures, see in particular FIG. 13, the latch receptacles 332 cause a discontinuity in the outside surface 316. That is, the latch receptacles 332 have edges and prevent the outside surface on each side from being an uninterrupted smooth plane all the way across and around the adapter 300. However, there is still no communication between the latch receptacles 332 and the adapter 300.

Associated with each of the latch receptacles 332 are external latches 334. The external latches 334 are preferably formed within a portion of the latch receptacles 332. As illustrated (e.g., FIG. 15), the external latches 334 are cantilevered and have a sloped front surface 336. See, e.g., FIGS. 13 and 14. The latch receptacles 332 also have a rearward facing flat surface 338 that engages the panel 200 when the adapter 300 is disposed within the panel 200 to reduce the possibilities of the adapter inadvertently falling out of the adapter panel 200. The sloped front surface 336 cause the external latches 334 to be deflected into a corresponding latch receptacle 332 as the external latches 334 engage and pass through the opening 202 in the panel 200. However, the external latches 334 do not penetrate the outer surface 316 or move into the main opening 324. In this case, the external latches 334 remain outside the main body 302 and the main opening 324, thereby not providing any openings into the adapter 300 for dust and debris to enter. The main body 302 of the adapter 300 has, at the locations of the latch receptacles 332, a thickened area T between the outside surface 116 and the inner surface 326. See, e.g., FIG. 15.

The latch receptacles 332 and the external latches 334 may be on different walls than illustrated. For example, the external latches 334 could be on the side walls 308,310 rather than on the top and bottom walls 104,106.

Figure 17:
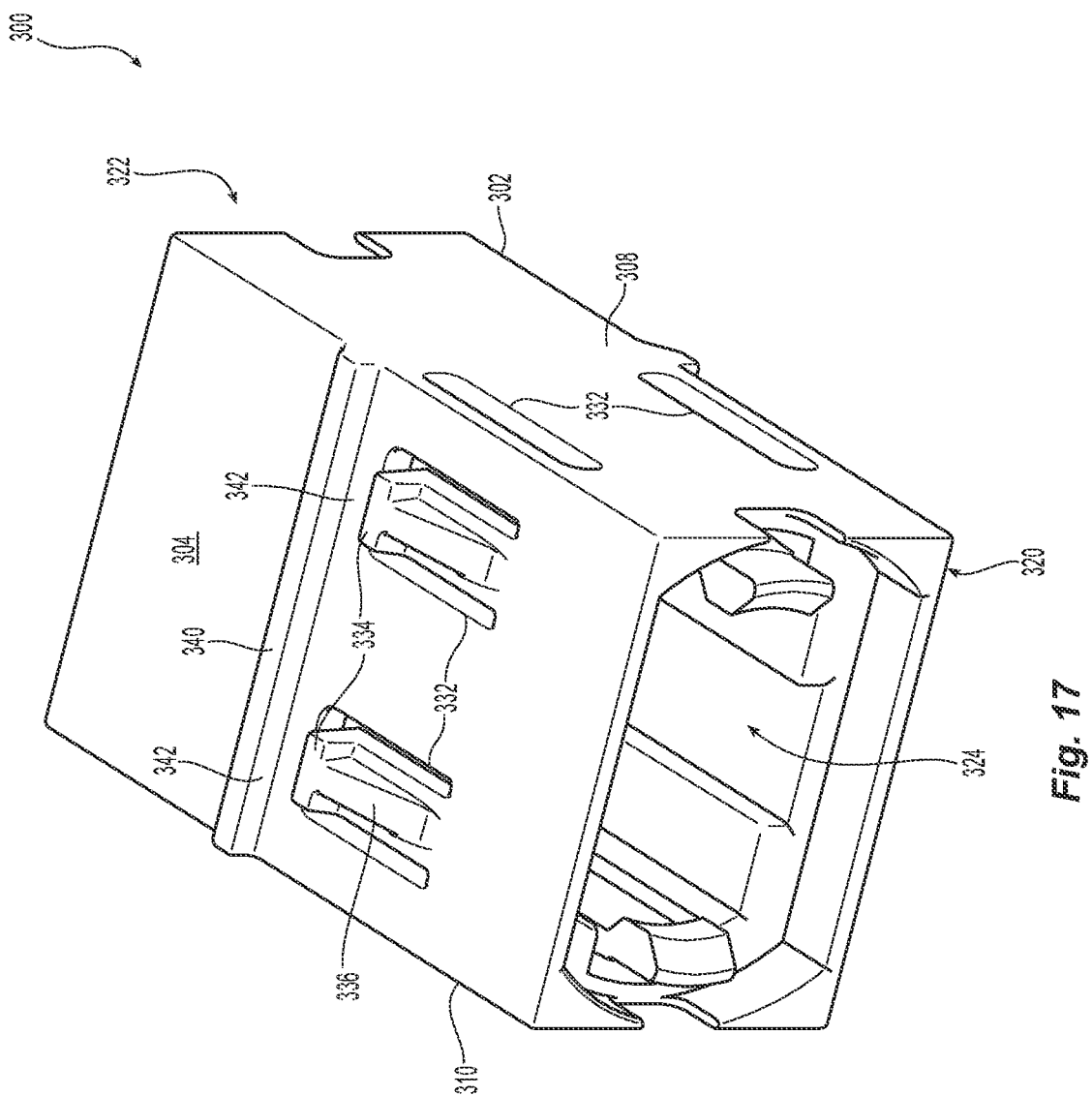
FIG. 17 is perspective view of the adapter in FIG. 13 from the top front left of the adapter.

The adapter 200 has two flanges 340 that extend from the outside surface 316 and the top and bottom walls 104,106 (see FIGS. 13, 14, and 17). Again, the flanges 340 could be on other walls of the main body 302 and need not be across the main opening 324 from one another. Additionally, the flanges 140 could have other configurations and positions along the walls from that illustrated in the figures. For example, the flanges 340 do not need to extend all the way across the main body 302 or be continuous, nor do the flanges 140 above.

As best seen in FIG. 14, the adapter 300 has a space 342 between a forward surface 344 of the flange 340 and the rearward facing flat surface 338. The space 342 has a width W that corresponds to the width of the panel 200 at the window 202. It may be that the width W is slightly smaller than the width of the panel 200 at the window 202 to allow for an easy return of the external latch 334 after the adapter 300 is inserted into the panel 200. However, the larger the width W is, the more the adapter 300 may move about in the panel 200, and such movement is clearly not preferred.

Accordingly, various aspects of this disclosure provide a material separation between the connector mating space 130,230,330 and the movement of the respective external latches 134, 134, 334 to reduce dust and debris from entering the adapter 100,202,300 and thus to prevent disruption in optical communications facilitated thereby.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A fiber optic adapter for connecting fiber optic connectors comprising:
   a main body having a top wall and a bottom wall joined to each other by a pair of oppositely disposed side walls along respective edges, the main body having an outside surface;
   a first side, a second side longitudinally opposite the first side, and a main opening, the main opening defined by the top wall, bottom wall and the side walls and extending between the first side and the second side to accept at least one fiber optic connector operable to mate in each of the first side and the second side;
   an inner surface defined at least in part by the top wall, the bottom wall, and the side walls, the inner surface surrounding the main opening, the main opening having a fiber optic connector mating space within which the at least one fiber optic connector in each of the first side and second side mate, the inner surface having a continuous separation from the outside surface at least around the fiber optic connector mating space by a material of the fiber optic adapter;
   at least two latch receptacles formed on the outside surface; and
   at least two external latches formed respectively at the at least two latch receptacles on the outside surface without communicating with the inner surface of the fiber optic adapter to maintain the continuous separation of the inner surface from the outer surface of the main body of the fiber optic adapter.

2. The fiber optic adapter according to claim 1, further comprising a flange on each of respective outside surfaces of the pair of opposing side walls or on each of respective outside surfaces of the top wall and the bottom wall.

3. The fiber optic adapter according to claim 2, wherein a distance between the flange and an engagement surface of the at least two external latches corresponds to a width of an adapter panel.

4. The fiber optic adapter according to claim 1, wherein the at least two external latches each comprise a cantilevered member.

5. The fiber optic adapter according to claim 1, wherein the at least two latch receptacles cause a discontinuity in the outside surface.

6. The fiber optic adapter according to claim 1, wherein the two external latches are not accessible from the main opening.

7. The fiber optic adapter according to claim 1, wherein the at least two latch receptacles cause a discontinuity in one of the top wall and the bottom wall.

8. The fiber optic adapter according to claim 1, wherein the at least two latch receptacles cause a discontinuity in at least one of the pair of opposite side walls.

9. The fiber optic adapter of claim 1, wherein the at least two external latches are integrally formed with the main body of the fiber optic adapter.

10. The fiber optic adapter of claim 1, wherein the main body forms a unitary fiber optic adapter.

11. An adapter panel comprising a plurality of fiber optic adapters, wherein each fiber optic adapter in the plurality of fiber optic adapters is the fiber optic adapter of claim 1.

12. A fiber optic adapter for connecting fiber optic connectors comprising:
    a main body having a top wall and a bottom wall and two side walls, the main body having an outside surface;
    a first side, a second side, and a main opening, the main opening defined by the top wall, bottom wall and side walls and extending between the first side and the second side to accept at least one fiber optic connector operable to mate in each of the first side and the second side;

an inner surface defined at least in part by the top wall, the bottom wall, and the side walls, the inner surface surrounding the main opening, the inner surface having a continuous separation from the outside surface by a material of the fiber optic adapter;

at least two latch receptacles formed on the outside surface; and at least two external latches formed respectively at the at least two latch receptacles on the outside surface without communicating with the inner surface of the fiber optic adapter.

13. The fiber optic adapter of claim 12, wherein the at least two external latches are integrally molded with the main body of the fiber optic adapter.

14. The fiber optic adapter of claim 12, wherein the at least two external latches include four external latches.

15. The fiber optic adapter of claim 12, wherein the at least two external latches are centrally located on the outside surface of the main body in a longitudinal direction between the first side and the second side.

16. The fiber optic adapter of claim 12, further comprising grooves to align at least four fiber optic connectors on each of the first side and the second side, each fiber optic connector supporting at least two optical fibers.

17. The fiber optic adapter according to claim 12, further comprising a flange on each of the two side walls.

18. The fiber optic adapter according to claim 12, further comprising a flange on each of the top wall and the bottom wall on the outside surface.

* * * * *